United States Patent Office 3,234,226
Patented Feb. 8, 1966

---

3,234,226
2,4,7-TRIAMINO-6-(BIPHENYLYL)PTERIDINES
Thomas S. Osdene, Berwyn, and Peter B. Russell, Villanova, Pa., assignors to American Home Products Corporation, New York, N.Y., a corporation of Delaware
No Drawing. Filed Mar. 19, 1965, Ser. No. 441,302
4 Claims. (Cl. 260—251.5)

This invention relates to new compounds of the pteridine series.

More particularly, this invention relates to novel 2,4,7-triamino-6-(biphenylyl)pteridines and to the method by which such componds are prepared.

Considered in their broadest aspect, the novel compounds of the present invention include those encompassed within the following formula:

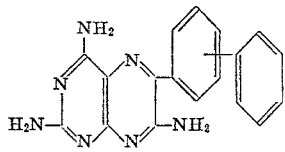

wherein the position of the phenyl ring forming the biphenylyl radical, as evidenced by the dangling valence, is positioned at the ortho, meta or para position with respect to the 6-phenyl ring.

The reaction by which the new compounds of the present invention may be prepared is shown in the reaction sequence which follows:

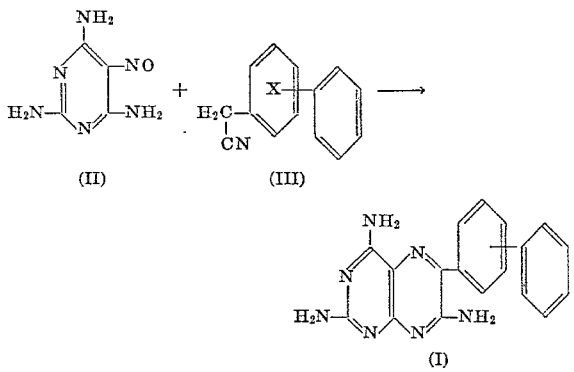

The 2,4,7-triamino-6-(biphenylyl)pteridines of the present invention are prepared by condensing 2,4,6-triamino-5-nitrosopyrimidine with the appropriate (o-biphenylyl)acetonitrile. The condensation is accomplished in accordance with the reaction sequence shown, by heating these compounds in a suitable solvent such as for example 2-ethoxyethanol, butanol, formamide or dimethylformamide in the presence of sodium or an anhydrous sodium compound such as sodium ethoxide or sodium methoxide. The condensation is preferably accomplished in the presence of anhydrous 2-ethoxyethanol and sodium metal. The resulting and desired pteridine product is precipitated and may be recrystallized if desired according to conventional practice such as for example from aqueous dimethylformamide.

The starting materials identified by (II) and (III) in the reaction sequence shown are known or are readily preparable by known methods. The 2,4,6-triamino-5-nitrosopyrimidine (II) is prepared by the conventional treatment of 2,4,6-triaminopyrimidine with nitrous acid. The biphenylyl acetonitriles (III) used are known compounds or can be prepared according to the method of Von Braun and Manz, Annalen der Chemie, vol. 468, page 258 (1929). It is of course necessary that the phenyl radical forming the biphenylyl group be appropriately positioned in the ortho, meta or para position as specified above.

While not identified in Formula I above, the new compounds of the present invention also encompassed the pharmaceutically acceptable acid addition salts thereof. Such salts are prepared according to conventional technique by reacting the bases with a suitable acid in alcohol, preferably a lower alcohol, and then evaporating the alcohol solvent to leave the salt. Alternatively, salt formation can be carried out in an aqueous slurry or solution. Suitable acids for this purpose include hydrobromic, sulfuric, phosphoric, nitric, benzoic, methyl sulfonic, p-tolyl sulfonic, benzene sulfonic, naphthalene sulfonic, salicylic, glycolic, acetic, maleic, succinic, tartaric, stearic, palmitic, citric, glutaric, lactic and the like.

The new compounds of the present invention have been found to possess quite unexpectedly valuable properties. Specifically the new compounds of the present invention have been found to possess potent antibacterial activity.

When used for the foregoing purposes, the new compounds of the present invention may be combined with suitable carriers in accordance with the purpose for which the compounds are to be used. The new compounds may be given orally in amounts of from about 0.5 to about 4.0 grams and in substantially similar amounts as 5% solutions. Topically they may be used as a powder, 5% ointment, 2.5 to 3% spray or 2.5% solution. On this basis it will be seen that when used for antibacterial purposes, the new compounds of the present invention are generally administered in a manner similar to the sulfur family of drugs such as for example sulfadiazine and sulfathiazole.

Reference now to specific examples which follow will provide a better understanding of the new compounds of the present invention as well as the method by which they are prepared.

Example I

To a solution of 0.66 g. of sodium metal dissolved in 500 ml. of dried 2-ethoxyethanol, there is added 4.43 g. of 2,4,6-triamino-5-nitrosopyrimidine followed by 6.15 g. of (o-biphenylyl)acetonitrile. The mixture is stirred mechanically and boiled under reflux for 6 hours. The solution is filtered and the filtrate concentrated to dryness on a rotary evaporator. The residue is treated with water and the brown precipitate formed removed by filtration. Recrystallization of the product from aqueous dimethylformamide affords 2,4,7-triamino-6-(o-biphenylyl)pteridine, M.P. 362° C.

*Analysis.*—Calculated: C=65.64, H=4.59, N=29.77. Found: C=65.19, H=4.70, N=29.61.

Example II

Reaction of 2,4,6-triamino-5-nitrosopyrimidine with (m-biphenylyl)acetonitrile as described in Example I affords 2,4,7-triamino-6-(m-biphenylyl)pteridine.

Example III

Reaction of 2,4,6-triamino-5-nitrosopyrimidine with (p-biphenylyl)acetonitrile as described in Example I provides 2,4,7-triamino-6-(p-biphenylyl)pteridine.

The invention claimed is:
1. A compound selected from the group consisting of (1) a compound having the formula:

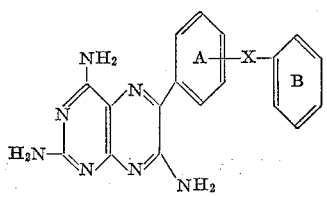

wherein the valence X of ring B is at a position on ring A selected from the group consisting of ortho, meta and para and (2) the therapeutically acceptable, nontoxic acid addition salts thereof.

2. 2,4,7-triamino-6-(o-biphenylyl)pteridine.
3. 2,4,7-triamnno-6-(m-biphenylyl)pteridine.
4. 2,4,7-triamino-6-(p-biphenylyl)pteridine.

No references cited.

IRVING MARCUS, *Primary Examiner*.